United States Patent
Chen et al.

(10) Patent No.: US 11,809,337 B2
(45) Date of Patent: Nov. 7, 2023

(54) GRAPHICS PROCESSING DEVICE

(71) Applicant: REALTEK SEMICONDUCTOR CORPORATION, Hsinchu (TW)

(72) Inventors: Yi-Cheng Chen, Hsinchu (TW); Hsu-Jung Tung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 86 days.

(21) Appl. No.: 17/331,673

(22) Filed: May 27, 2021

(65) Prior Publication Data

US 2022/0027293 A1 Jan. 27, 2022

(30) Foreign Application Priority Data

Jul. 22, 2020 (TW) .................................. 109124794

(51) Int. Cl.
*G06F 13/16* (2006.01)
*G06T 1/20* (2006.01)

(52) U.S. Cl.
CPC ............ *G06F 13/1652* (2013.01); *G06T 1/20* (2013.01); *G06F 2213/0038* (2013.01)

(58) Field of Classification Search
CPC G06F 13/1652; G06F 2213/0038; G06T 1/20
See application file for complete search history.

(56) References Cited

U.S. PATENT DOCUMENTS

| | | |
|---|---|---|
| 7,768,517 B2 | 8/2010 | Diard et al. |
| 2007/0195099 A1 | 8/2007 | Diard |

(Continued)

FOREIGN PATENT DOCUMENTS

| | | |
|---|---|---|
| CN | 202503624 U | 10/2012 |
| CN | 103246496 A | 8/2013 |

(Continued)

OTHER PUBLICATIONS

OA letter of the counterpart TW application (appl. No. 109124794) dated Nov. 30, 2021. Summary of the TW OA letter in regard to the TW counterpart application: (1) Claims 1, 5, 6, and 10 are rejected as being unpatentable over the cited reference 1 (US2019/0206023A1). (2) Claim 2 is rejected as being unpatentable over the cited reference 1 in view of the cited reference 2 (TW200807328A). (3) Claims 3, 4, and 7-9 are rejected as being unpatentable over the cited reference 1 in view of the cited reference 3 (CN110717853A). P.S. Correspondence between the claims of the TW counterpart application and the claims of the present US application: (1) Claims 1, 2, 3, . . . , and 10 of the TW counterpart application are corresponding to the claims 1, 2, 3, 8, 10, 12, 16, 17, 18, and 19 of the present US application respectively.

(Continued)

*Primary Examiner* — Sing-Wai Wu
*Assistant Examiner* — Khoa Vu
(74) *Attorney, Agent, or Firm* — WPAT, P.C

(57) ABSTRACT

Disclosed is a graphics processing device including a main SoC, a performance-enhancing SoC, and an external circuit that is set outside any of the two SoCs. The main SoC includes: a first graphics processing unit (GPU) dividing to-be-processed data into a first input part and a second input part, and processing the first output part to generate first output data; and a first transceiver circuit forwarding the second input part to the performance-enhancing SoC via the external circuit, and then receiving second output data via (Continued)

the external circuit and forwarding it. The performance-enhancing SoC includes: a second transceiver circuit receiving the second input part via the external circuit and outputting the second output data to the main SoC via the external circuit; and a second GPU receiving the second input part from the second transceiver circuit and processing this part to provide the second output data for the second transceiver.

19 Claims, 13 Drawing Sheets

(56) References Cited

U.S. PATENT DOCUMENTS

| | | | |
|---|---|---|---|
| 2013/0169655 A1* | 7/2013 | Rha | G06F 8/65 710/305 |
| 2016/0091941 A1* | 3/2016 | C.R. | G06F 1/3243 713/310 |
| 2017/0286360 A1* | 10/2017 | Srivastava | G06F 13/4295 |
| 2018/0300045 A1* | 10/2018 | Surti | G09G 5/363 |
| 2019/0206023 A1* | 7/2019 | Dimitrov | G06F 12/0842 |
| 2020/0043122 A1* | 2/2020 | Xiao | G06T 15/80 |

FOREIGN PATENT DOCUMENTS

| | | |
|---|---|---|
| CN | 107391232 A | 11/2017 |
| CN | 110717853 A | 1/2020 |
| TW | 200807328 A | 2/2008 |
| TW | 200807328 A | 2/2008 |

OTHER PUBLICATIONS

1) OA letter of a counterpart TW application (appl. No. 109124794) dated Jun. 29, 2022. 2) Summary of the TW OA letter in regard to the TW counterpart application: 1. Claims 1, 5, 6, and 10 are rejected as being unpatentable over the cited reference 1 (US2019/0206023A1) in view of the cited reference 2 (CN103246496A). 2. Claim 2 is rejected as being unpatentable over the cited reference 1 in view of the cited reference 2 and further in further in view of the cited reference 3 (TW200807328A). (3) claims 3, 4, and 7-9 are rejected as being unpatentable over the cited reference 1 in view of the cited reference 2 and further in view of the cited reference 4 (CN110717853A).

* cited by examiner

GRAPHICS PROCESSING DEVICE

BACKGROUND OF THE INVENTION

1. Field of the Invention

The present disclosure relates to a graphics processing device, especially to a graphics processing device including multiple SoCs configured to cooperate.

2. Description of Related Art

A design of integrating all main functions of an end product (a.k.a. system) into a single chip is the design of a system on a chip (SoC).

An SoC having a low arithmetic capability is often used in a low-end electronic product (e.g., a television (TV) product of 1920×1080 resolution), while an SoC having a high arithmetic capability is often used in a high-end electronic product (e.g., a TV product of 3840×1920 resolution). Generally, the total research, development, and manufacturing cost of multiple SoCs having different arithmetic capabilities is higher than the research, development, and manufacturing cost of any of the multiple SoCs alone, and it's not cost-effective to apply an SoC having a high arithmetic capability to a low-end electronic product. Accordingly, it would be helpful if there was an invention capable of achieving a high arithmetic capability with the cooperation of multiple same/similar SoCs having low arithmetic capabilities, which implies that a single SoC having a low arithmetic capability could be used in a low-end electronic product while the combination of multiple same/similar SoCs having low arithmetic capabilities could be used in a high-end electronic product.

The existing multi-core and multi-cluster technologies include a Generic Interrupt Controller (GIC) technology, a Coherent Mesh Network (CMN) technology, and a Cache Coherent Interconnect for Accelerators (CCIX) technology. These technologies do not concentrate on the cooperation of multiple SoCs.

SUMMARY OF THE INVENTION

An object of the present disclosure is to provide a graphics processing device including multiple circuit chips configured to cooperate and achieve a higher graphics processing performance, wherein each of the circuit chips is a system on a chip (SoC).

An embodiment of the graphics processing device of the present disclosure includes a first SoC, an external circuit, and a second SoC. The first SoC includes a first graphics processing unit (GPU) and a first transceiver circuit. The first GPU is configured to divide to-be-processed data into multiple input parts including a first input part and a second input part in a performance-enhancing mode, and to process the first input part to generate and output first output data in the performance-enhancing mode. The first transceiver circuit is coupled to the first GPU, and configured to transmit the second input part to the second SoC via the external circuit in the performance-enhancing mode, and further configured to receive second output data from the external circuit to forward the second output data in the performance-enhancing mode. The external circuit is outside any of the first SoC and the second SoC. The second SoC includes a second transceiver and a second GPU. The second transceiver circuit is configured to receive the second input part from the external circuit in the performance-enhancing mode, and further configured to transmit the second output data to the first SoC via the external circuit in the performance-enhancing mode. The second GPU is coupled to the second transceiver circuit, and configured to receive and process the second input part to generate the second output data in the performance-enhancing mode, and then output the second output data to the second transceiver circuit in the performance-enhancing mode.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses an image processing device, a data processing device, and a graphics processing device. Each of the devices includes a plurality of circuit chips configured to cooperate to achieve a higher processing performance, wherein each of the circuit chips is a system on a chip (SoC). For better understanding, multiple embodiments, examples, and exemplary implementations are described in this specification, but the way to implement the present invention is not limited thereto.

Figure 1:
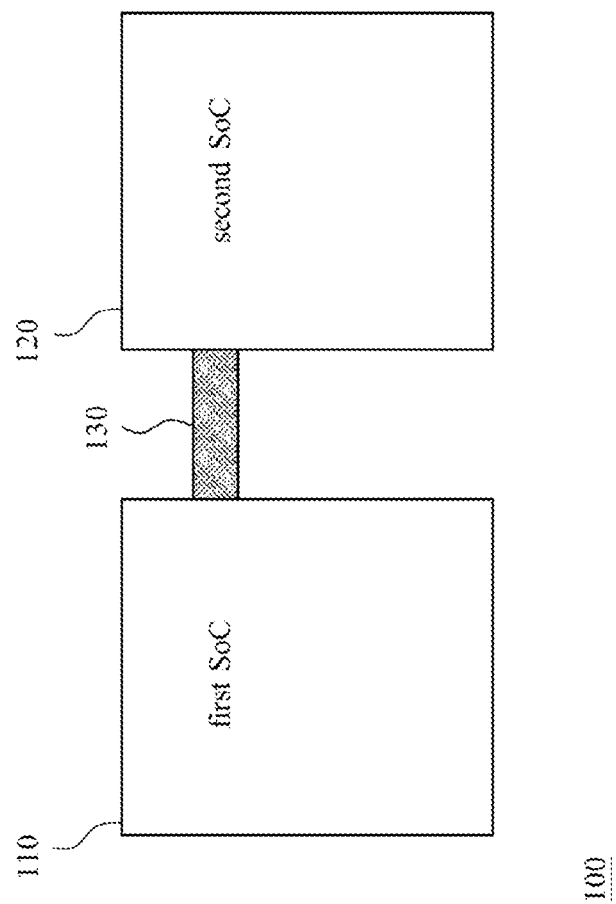
FIG. 1 shows an embodiment of the image processing device of the present disclosure.

FIG. 1 shows an embodiment of the image processing device of the present disclosure. The image processing device 100 of FIG. 1 includes a first SoC 110, a second SoC 120, and an external circuit 130. The first SoC 110 functions as a main SoC while the second SoC 120 functions as a performance-enhancing SoC, that is to say an auxiliary SoC. The circuit configurations of the first SoC 110 and the second SoC 120 can be the same or different. Some circuit(s) in the first SoC 110 and/or in the second SoC 120 can be disabled/idle according to the demand for implementation, and thereby can be omitted. The external circuit 130 is not included in any of the first SoC 110 and the second SoC 120;

in other words, the external circuit 130 is set outside the first SoC 110 and the second SoC 120. For example, if both the first SoC 110 and the second SoC 120 are packaged chips set on a circuit board (e.g., printed circuit board; PCB), the external circuit 130 can be/include a signal transmission line (e.g., metal line) of the circuit board. For another example, if both the first SoC 110 and the second SoC 120 are non-packaged dies that are packaged in a semiconductor package, the external circuit 130 can be formed with a semiconductor package process (e.g., wire-bonding process, or flip-chip process) and included in the semiconductor package; in this case the external circuit 130 includes at least of the following: at least one connection pad; at least one connection wire; at least one conducting ball (e.g., metal ball); and at least one transmission line formed on the surface of a substrate of the semiconductor package or on a layer of the substrate (e.g., multilayer substrate).

Figure 2:
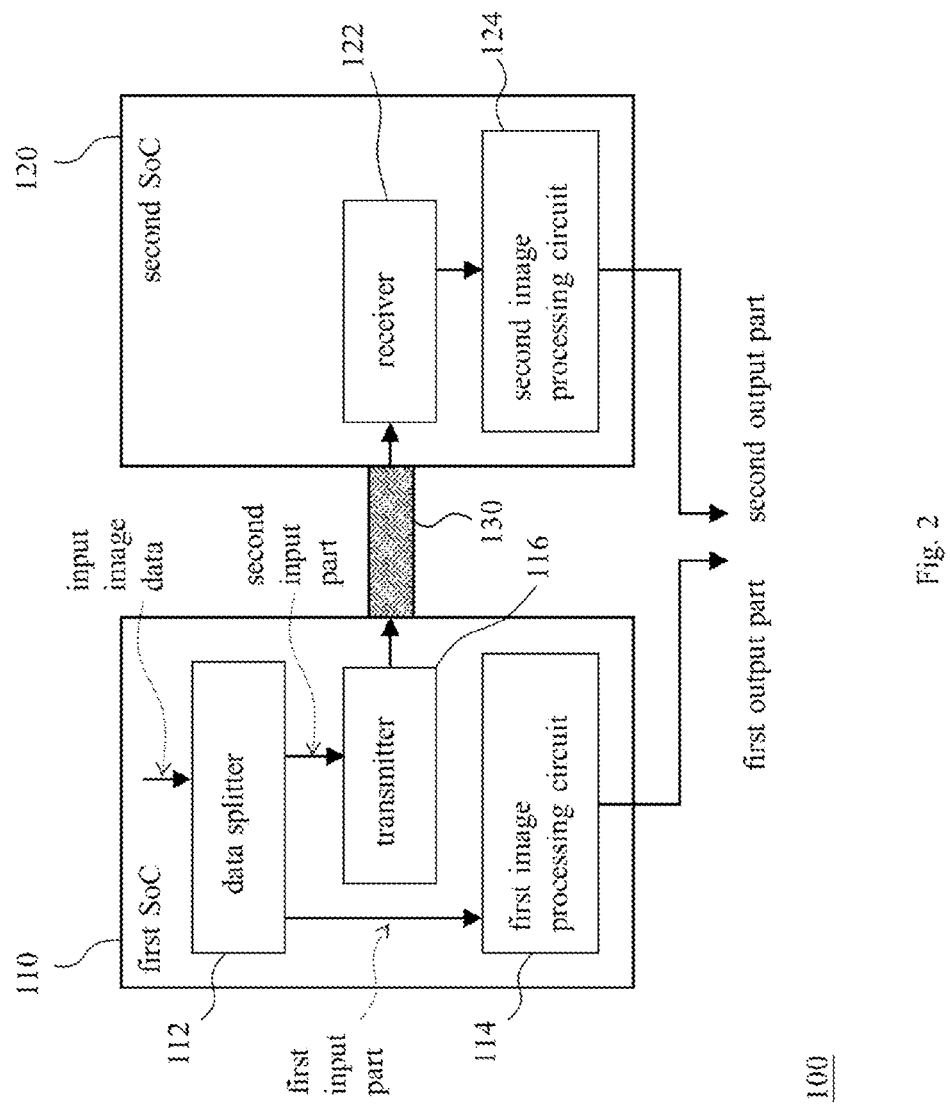
FIG. 2 shows an embodiment of the first SoC and the second SoC of FIG. 1.

FIG. 2 shows an embodiment of the first SoC 110 and the second SoC 120. As shown in FIG. 2, the first SoC 110 includes a data splitter 112, a first image processing circuit 114, and a transmitter 116 in a first image circuit cooperation area. The second SoC 120 includes a receiver 122 and a second image processing circuit 124 in a second image circuit cooperation area. Each of the first SoC 110 and the second SoC 120 is used for processing a part of input image data, so that the two SoCs cooperate to achieve an image processing performance that is higher than the maximum image processing performance of any of the two SoCs alone. The detail of the first SoC 110 and the second SoC 120 is described in the later paragraphs.

Please refer to FIGS. 1-2. The data splitter 112 is configured to divide the input image data into N input parts including a first input part and a second input part; and the first image processing circuit 114 and the second image processing circuit 124 are configured to process the first input part and the second input part respectively, wherein the number "N is an integer greater than one and indicative of the image processing device 100 including N SoCs configured to cooperate. In an exemplary implementation, the data splitter 112 counts the received horizontal pixels of a horizontal line of the input image data to determine the horizontal location of a currently received horizontal pixel, and accordingly divides the input image data into a left half and a right half (when N=2) or divided the input image data into three or more parts (when N>2). The data splitter 112 can be realized with a known or self-developed technology and its acts can be learned in accordance with the present disclosure. In an exemplary implementation, the number "N" is two; the processing capability of each of the first image processing circuit 114 and the second image processing circuit 124 is related to an image size and a frame rate, and the product of the image size and the frame rate is constant or predetermined; the image size and frame rate conditions include "7680 pixels×4320 pixels and 60 Hz" (8K4K60 Hz), "3840 pixels×4320 pixels and 120 Hz" (4K4K120 Hz), "3840 pixels×2160 pixels and 120 Hz" (4K2K120 Hz), and "1920 pixels×2160 pixels and 120 Hz" (2K2K120 Hz), but the present invention is not limited thereto; and the input image data can be split in one of the following division manners:

(1) Providing the image size and frame rate condition of the input image data is 8K4K60 Hz, the input image data includes data of a picture; the first input part of the input image data is corresponding to the left half of the picture, and the image size and frame rate condition of the first input part is 4K4K60 Hz; the second input part of the input image data is corresponding to the right half of the picture, and the image size and frame rate condition of the second input part is also 4K4K60 Hz.

(2) Providing the image size and frame rate condition of the input image data is 8K4K60 Hz, the input image data includes data of a picture; the first input part of the input image data is corresponding to the left half of the picture plus a part of the right half of the picture, and the image size and frame rate condition of the first input part is "(3840+n) pixels×4320 pixels and 60 Hz" ((4K+n)4K60 Hz), wherein the number "n" here is a positive integer smaller than 3840; the second input part of the input image data is corresponding to the right half of the picture plus a part of the left half of the picture, and the image size and frame rate condition of the second input part is also (4K+n)4K60 Hz. In this case, the part of the right half of the picture included in the first input part and the part of the left half of the picture included in the second input part are usually the regions in the proximity of the boundary between the left half of the picture and the right half of the picture, and are used as references to help the first image processing circuit 114 and the second image processing circuit 124 to generate the processed left half of the picture and the processed right half of the picture that can be combined seamlessly.

(3) Providing the image size and frame rate condition of the input image data is 4K2K120 Hz, the input image data includes data of a picture; the first input part of the input image data is corresponding to the left half of the picture, and the image size and frame rate condition of the first input part is 2K2K120 Hz; the second input part of the input image data is corresponding to the right half of the picture, and the image size and frame rate condition of the second input part is also 2K2K120 Hz.

(4) Providing the image size and frame rate condition of the input image data is 4K2K120 Hz, the input image data includes data of a picture; the first input part of the input image data is corresponding to the left half of the picture plus a part of the right half of the picture, and the image size and frame rate condition of the first input part is "(1920+n) pixels×2160 pixels and 120 Hz" ((2K+n) 2K120 Hz), wherein the number "n" here is a positive integer smaller than 1920; the second input part of the input image data is corresponding to the right half of the picture plus a part of the left half of the picture, and the image size and frame rate condition of the second input part is also (2K+n)2K120 Hz. In this case, the part of the right half of the picture included in the first input part and the part of the left half of the picture included in the second input part are usually the regions in the proximity of the boundary between the left half of the picture and the right half of the picture, and are used as references to help the first image processing circuit 114 and the second image processing circuit 124 to generate the processed left half of the picture and the processed right half of the picture that can be combined seamlessly.

Please refer to FIG. 1-2. The transmitter 116 is coupled to the data splitter 112, and configured to receive the second input part and then forward the second input part to the second SoC 120 via the external circuit 130. The receiver 122 is coupled to the external circuit 130, and configured to receive the second input part and then forward the second input part to the second image processing circuit 124. In an exemplary implementation, the communication between the transmitter 116 and the receiver 122 is based on a known or self-developed signaling standard (e.g., V-by-One HS standard or HDMI standard), but the transmission inside the first SoC 110 and the transmission inside the second SoC 120 are irrelevant to the signaling standard, wherein the maximum data transmission rate specified by the signaling standard is usually not lower than the image processing capability of the second SoC. In an exemplary implementation, the first SoC 110 includes a first encryption circuit (not shown) to encrypt the second input part before the first SoC 110 transmits the second input part to the receiver 122 via the external circuit 130; and the second SoC 120 includes a second decryption circuit (not shown) to decrypt the second input part after the second SoC 120 receives the second input part from the first SoC 110. In an exemplary implementation, the first SoC 110 is configured to receive data from the second SoC 120 with a first transceiver circuit (e.g., the first transceiver circuit 310 in FIG. 3) including the transmitter 116; on condition that the data from the second SoC 120 is encrypted data, the first SoC 110 includes a first decryption circuit (not shown) for decrypting the encrypted data from the second SoC 120; the second SoC 120 is configured to output data to the first SoC 110 with a second transceiver circuit (e.g., the second transceiver circuit 320 in FIG. 3) including the receiver 122, and the second SoC 120 may include a second encryption circuit (not shown) for encrypting data before the second transceiver circuit outputs the data to the first transceiver circuit according to the demand for implementation. The above-mentioned encryption circuit and decryption circuit can be realized with a known or self-developed technology (e.g., High-Bandwidth Digital Content Protection; HDCP).

Please refer to FIGS. 1-2. The first image processing circuit 114 is coupled to the data splitter 112, and configured to receive and process the first input part to generate a first output part of multiple output parts of output image data and then output the first output part to a back-end circuit (e.g., known panel control circuit). The second image processing circuit 124 is coupled to the receiver 122, and configured to receive and process the second input part to generate a second output part of the multiple output parts of the output image data and then output the second output part to the back-end circuit. Take the aforementioned division manner (1) or (2); the frame rate condition of the first/second input part is 60 Hz; if the image size and frame rate condition of the first/second output part is 4K4K120 Hz having a different frame rate, the first image processing circuit 114/the second image processing circuit 124 includes a known or self-developed frame rate converter (FRC) (e.g., the frame rate converter 420 of FIG. 4) to convert the frame rate of the first/second input part (i.e., 60 Hz) into the frame rate of the first/second output part (i.e., 120 Hz), so that the first output part and the second output part jointly form a complete image frame within a period equivalent to one over the output frame rate (i.e., $\frac{1}{120}$ Hz). Take the aforementioned division manner (3) or (4); the image size condition of the first/second input part is "1920 pixels×2160 pixels or (1920+n) pixels×2160 pixels"; if the image size and frame rate condition of the first/second output part is 4K4K120 Hz having a different image size, the first image processing circuit 114/the second image processing circuit 124 includes a known or self-developed scaler (e.g., the scaler 430 of FIG. 4) to scale up the image size of the first/second input part (i.e., 1920 pixels×2160 pixels or (1920+n) pixels×2160 pixels) according to the image size of the first/second output part (i.e., 3840 pixels×4320 pixels), so that the first output part and the second output part jointly form a complete image frame within a period equivalent to one over the output frame rate (i.e., $\frac{1}{120}$ Hz). In addition, according to the demand for implementation, the first image processing circuit 114 may output at least a part of the first output part to the second image processing circuit 124 via the transmitter 116 and the receiver 122 in sequence and/or the second image processing circuit 124 may output at least a part of the second output part to the first image processing circuit 114 via the aforementioned second transceiver circuit and the first transceiver circuit in sequence, so as to meet specific requirements; for example, the first image processing circuit 114 and the second image processing circuit 124 may exchange data to be transmitted to a panel, and process the exchanged data to meet specific requirements of the panel.

It should be noted that the combination of the first output part and the second output part (e.g., the combination (8K4K120 Hz) of the left half of the picture (4K4K120 Hz) and the right half of the picture (4K4K120 Hz) in any of the aforementioned division manners) is characterized by an output image size and an output frame rate. The output image size and the output frame rate jointly determine a data amount per unit of time (e.g., 8K4K120 Hz); the data amount per unit of time exceeds the processing capability of the first image processing circuit 114 per unit of time (e.g., 4K4K120 Hz), and also exceeds the processing capability of the second image processing circuit 124 per unit of time (e.g., 4K4K120 Hz). In other words, the processing capability based on the cooperation of the first SoC 110 and the second SoC 120 is greater than the processing capability of any of the two SoCs.

Figure 3:
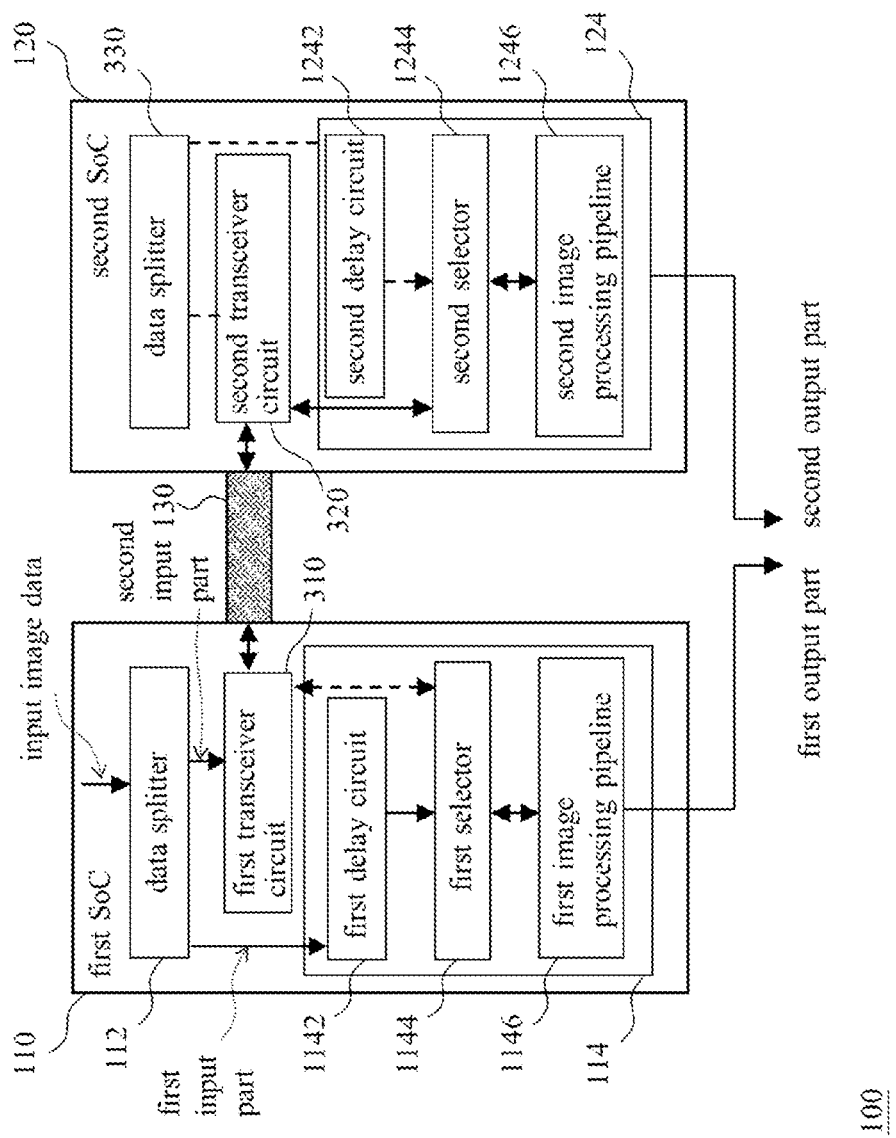
FIG. 3 shows another embodiment of the first SoC and the second SoC of FIG. 1.

FIG. 3 shows another embodiment of the first SoC 110 and the second SoC 120, especially shows the embodiment of the first image processing circuit 114 and the second image processing circuit 124. As shown in FIG. 3, the circuit configuration of the first SoC 110 is the same as the circuit configuration of the second SoC 120, and thus the first SoC 110 includes a first transceiver circuit 310 corresponding to a second transceiver circuit 320 included in the second SoC 120, wherein the first transceiver circuit 310 includes the transmitter 116 of FIG. 2 (not shown in FIG. 3) and the second transceiver circuit 320 includes the receiver 122 of FIG. 2 (not shown in FIG. 3). The second SoC 120 further includes a data splitter 330 corresponding to the data splitter 112 of the first SoC 110, but the data splitter 330 can be disabled or omitted since it is not necessary here. The first image processing circuit 114 and the second image processing circuit 124 may have the same circuit configurations, and some circuit(s) therein may be disabled or omitted if it/they are not necessary. The first image processing circuit 114 includes a first delay circuit 1142, a first selector 1144, and a first image processing pipeline 1146; similarly, the second image processing circuit 124 includes a second delay circuit 1242, a second selector 1244, and a second image processing pipeline 1246. It should be noted that if the input image data is/includes encoded data, the first image processing circuit 114/the second image processing circuit 124 may further include a known or self-developed decoder (not shown) to decode the encoded data, so that the first image processing pipeline 1146/the second image processing pipeline 1246 can process the decoded data. Since encoding and decoding technologies fall beyond the scope of the present invention, their detail is omitted here.

Please refer to FIG. 3. In consideration of that the transmission path for transmitting the first input part from the data splitter 112 to the first image processing circuit 114 is usually shorter than the transmission path for transmitting the second input part from the data splitter 112 to the second image processing circuit 124, the first delay circuit 114 is configured to receive and delay the first input part so that a first time point at which the first image processing circuit 114 receives the first input part is substantially synchronous with a second time point at which the second image processing circuit 124 receives the second input part. The term "substantially synchronous" indicates that the difference between the first time point and the second time point is less than a predetermined threshold and negligible. The first selector 1144 is set between the first delay circuit 1142 and the first image processing pipeline 1146, and coupled to the first transceiver circuit 310 (as illustrated with the dashed line in FIG. 3); and the first selector 1144 is configured to receive the first input part from the first delay circuit 114, and forward the first input part to the first image processing pipeline 1146. The first image processing pipeline 1146 is coupled to the first selector 1144, and configured to receive and process the first input part to generate the aforementioned first output part.

Please refer to FIG. 3. The second delay circuit 1242 is coupled to the data splitter 330 (as illustrated with the dashed line in FIG. 3), but both of them are idle here. The second selector 1244 is coupled to the second delay circuit 1242 (as illustrated with the dashed line in FIG. 3), and is set between the second transceiver circuit 320 and the second image processing pipeline 1246. The second selector 1244 is configured to receive the second input part from the second transceiver circuit 320, and forward the second input part to the second image processing pipeline 1246. The second image processing pipeline 1246 is coupled to the second selector 1244, and configured to receive and process the second input part to generate the aforementioned second output part.

Please refer to FIG. 3. In an exemplary implementation, the first signal processing pipeline 1146 and the second image processing pipeline 1246 exchange at least one synchronous signal (e.g., at least one horizontal synchronous signal and/or at least one vertical synchronous signal) so as to substantially synchronize the first output part with the second output part. In an exemplary implementation, a dedicated transmission line (not shown) is set between the first image processing pipeline 1146 and the second image processing pipeline 1246 for unidirectional or bilateral signal transmission, wherein at least a part of the dedicated transmission line is a part of the external circuit 130. People having ordinary skill in the art can refer to the description of the first transceiver 525, the external circuit 570, and the second transceiver 555 in FIG. 5 in later paragraphs to appreciate the way to realize the dedicated transmission line. The transmission between the first image processing pipeline 1146 and the second image processing pipeline 1246 can be realized in many ways including:

(1) Using the aforementioned dedicated transmission line to fulfill the transmission between the first image processing pipeline 1146 and the second image processing pipeline 1246. Each image processing circuit can receive/retrieve data from the other one image processing circuit according to the timing order of the input image data, and can also process data from the data splitter 112 to output the processed data. Data to be outputted to each image processing circuit can be stored in a buffer (not shown) temporarily in case this image processing circuit cannot process the data immediately.

(2) Using an existing path (i.e., the first transceiver circuit 310, the external circuit 130, and the second transceiver circuit 320) to fulfill the transmission between the first image processing pipeline 1146 and the second image processing pipeline 1246. If the existing path cannot be used for signal transmission and signal reception at the same time, each SoC may use a known or self-developed arbitrator (not shown) to allocate the time slots for the signal transmission and the signal reception according to the timing order of the input image data. If the existing path can be used for signal transmission and signal reception at the same time, each SoC can store the received data in a buffer (not shown) temporarily in case this SoC cannot process the received data immediately, and the image processing circuit of this SoC can also receive/retrieve the received data from the buffer and can process data from the data splitter 112 for output.

Figure 4:
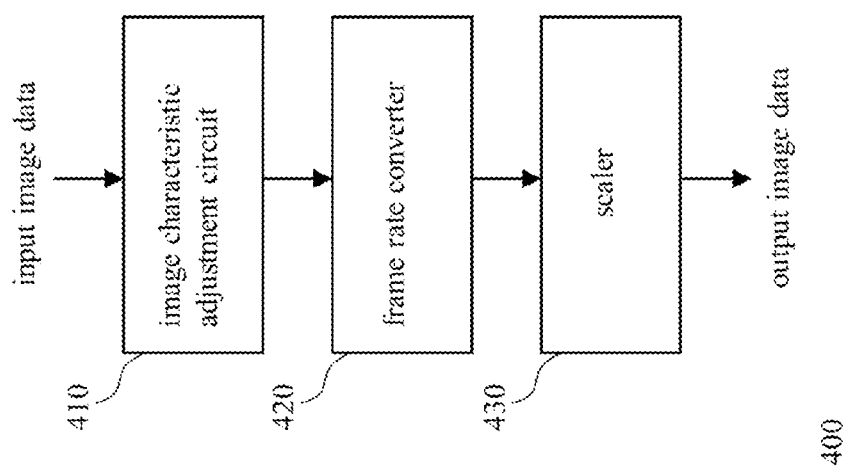
FIG. 4 shows an image processing pipeline as an embodiment of the first/second image processing pipeline of FIG. 3.

FIG. 4 shows an image processing pipeline 400 as an embodiment of any of the first image processing pipeline 1146 and the second image processing pipeline 1246. The image processing pipeline 400 includes a known or self-developed image characteristic adjustment circuit 410, a known or self-developed frame rate converter 420, and a known or self-developed scaler 430. The image characteristic adjustment circuit 410 is configured to make an adjustment in image characteristics such as brightness, contrast, and saturation. The positions of the circuits in the image processing pipeline 400 can be rearranged according to the demand for implementation. In addition, the image processing pipeline 400 may include more circuits (e.g., known or self-developed panel timing controller), and/or some unnecessary circuits in the image processing pipeline 400 may be omitted.

Figure 5:
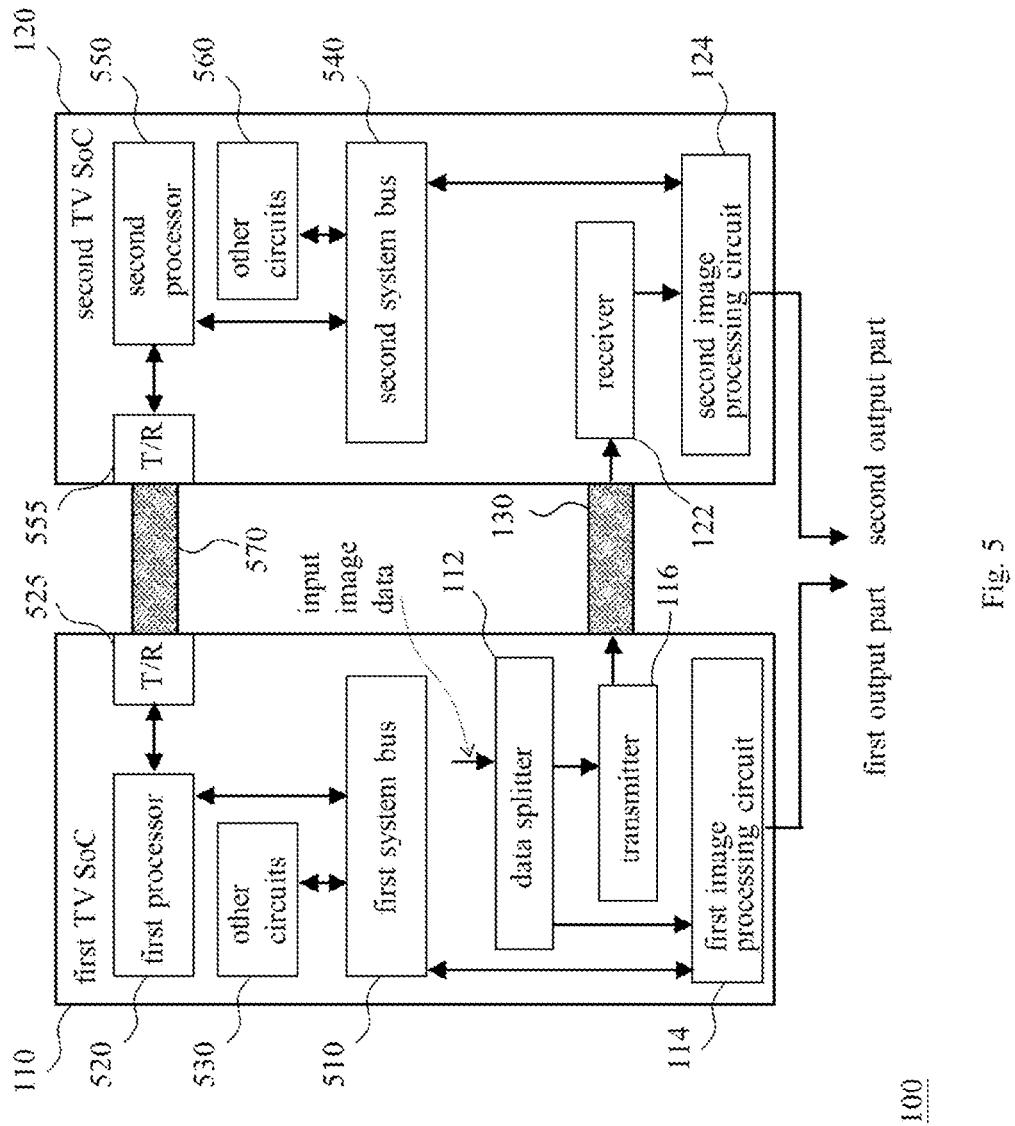
FIG. 5 shows yet another embodiment of the first SoC and the second SoC of FIG. 1.

FIG. 5 shows another embodiment of the first SoC 110 and the second SoC 120 of FIG. 1. In this embodiment, each of the first SoC 110 and the second SoC 120 is a television (TV) SoC for converting input video data into output video data that can be displayed with a TV panel. The first SoC 110 further includes a first system bus 510, a first processor 520 (e.g., central processing unit (CPU) or graphics processing unit (GPU)), a first transceiver 525, and other circuits 530 (e.g., network circuit, USB circuit, audio circuit, and storage circuit) in a first processor cooperation area. The second SoC 120 further includes a second system bus 540, a second processor 550, a second transceiver 555, and other circuits 560 in a second processor cooperation area. The first processor 520 and the second processor 550 are configured to cooperate and the transmission between the two processors are fulfilled with the first transceiver 525, the external circuit 570, and the second transceiver 555. The detail and modification of the above-mentioned cooperation is illustrated with the embodiments of FIGS. 6-13. It should be noted that the external circuit 570 and the external circuit 130 can be integrated into one circuit according to the demand for implementation; if so, each of the first SoC 110 and the second SoC 120 includes a memory data access circuit (as shown in FIG. 9) to control the destination of data. It should also be noted that the first transceiver 525 and the transmitter 116 can be integrated into one transceiver and the second transceiver 555 and the receiver 122 can be integrated into one transceiver, if practicable; and the data transmission management after the above-mentioned integration can be fulfilled with a known or self-developed arbitrator which operates according to a predetermined algorithm. In addition, the first image processing circuit 114 communicates with the first processor 520 through the first system bus 510 so as to use the computation resource of the first processor 520 or operate according to the command of the first processor 520. Similarly, the second image processing circuit 124 communicates with the second processor 550 through the second system bus 540 so as to use the computation resource of the second processor 550 or operate according to the command of the second processor 550. Each of the first SoC 110 and the second SoC 120 alone can satisfy the requirements of a low-end TV product (e.g., TV of 4K resolution), and the first SoC 110 and the second SoC 120 can cooperate to satisfy the requirements of a high-end TV product (e.g., TV of 8K resolution).

Figure 6:
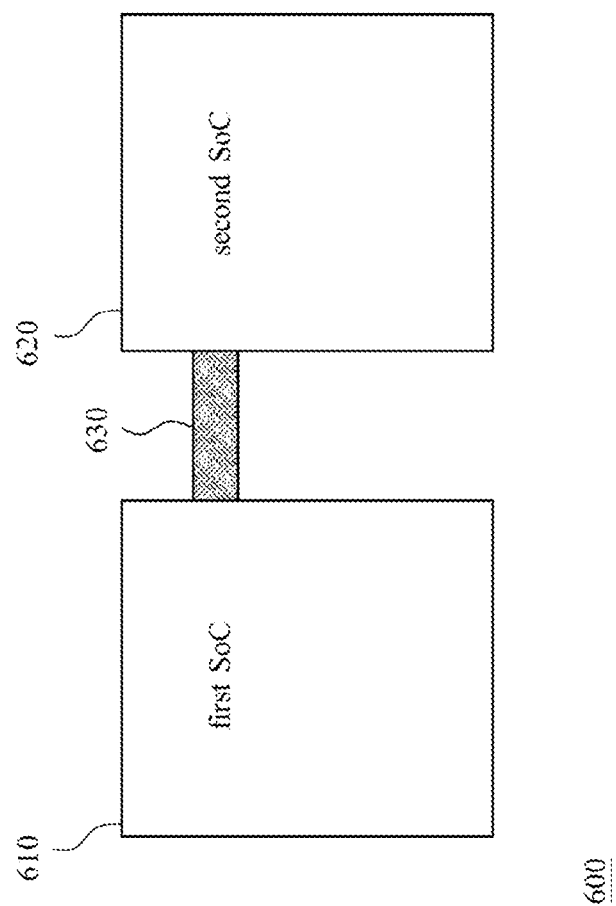
FIG. 6 shows an embodiment of the data processing device of the present disclosure.

FIG. 6 shows an embodiment of the data processing device of the present disclosure. The data processing device 600 of FIG. 6 includes a first SoC 610, a second SoC 620, and an external circuit 630. The first SoC 610 functions as a main SoC, the second SoC 620 functions as a performance-enhancing SoC, and they have the same or different circuit configurations; however, some circuit(s) in the first SoC 610 and/or some circuits(s) in the second SoC 620 may be idle according to the demand for implementation. The external circuit 630 is not included in any of the first SoC 610 and the second SoC 620. For example, providing both the first SoC 610 and the second SoC 620 are packaged chips set on a circuit board (e.g., PCB), the external circuit 630 is/includes a signal transmission line of the circuit board. For another example, providing both the first SoC 610 and the second SoC 620 are non-packaged dies included in a semiconductor package (e.g., wire-bonding package, flip-chip package), the external circuit 630 is a part of the semiconductor package and includes at least one of the following: at least one connection pad; at least one connection wire; at least one conducting ball (e.g., metal ball); and at least one transmission line formed on the surface of a substrate of the semiconductor package or on a layer of the substrate (e.g., multilayer substrate).

Figure 7:
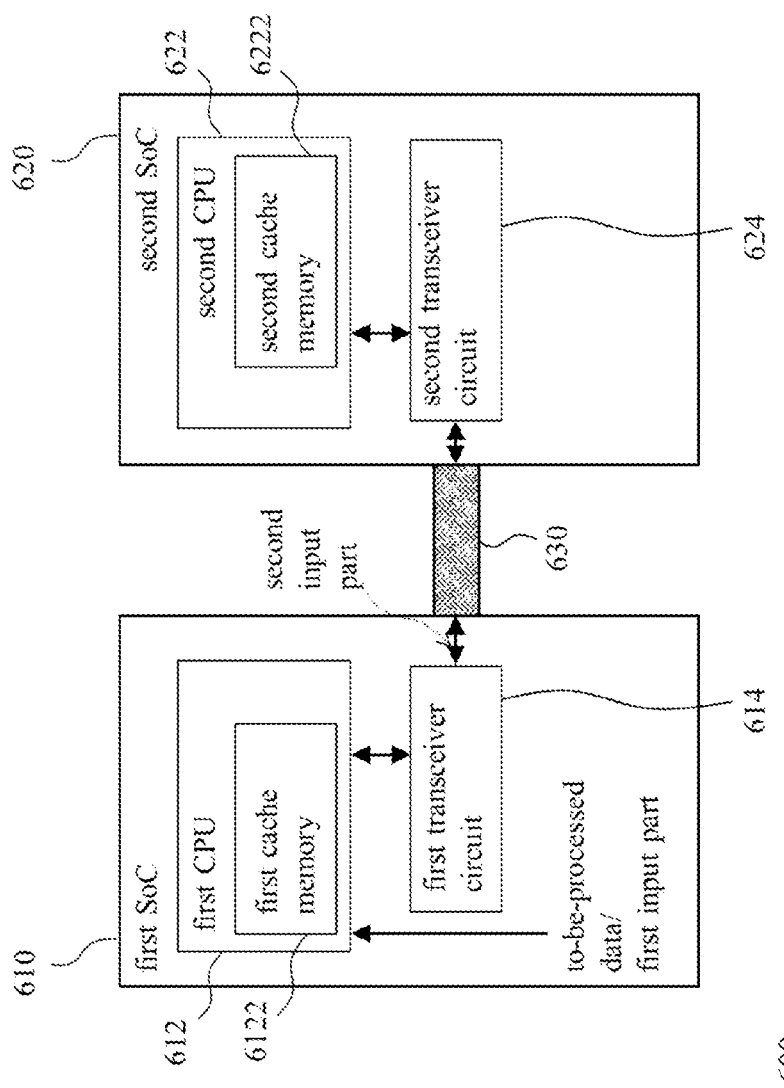
FIG. 7 shows an embodiment of the first SoC and the second SoC of FIG. 6.

FIG. 7 shows an embodiment of the first SoC 610 and the second SoC 620 of FIG. 6. As shown in FIG. 7, the first SoC 610 includes a first CPU 612 and a first transceiver circuit 614, and the second SoC 620 includes a second CPU 622 and a second transceiver circuit 624. Each of the first SoC 610 and the second SoC 620 is configured to process a part of to-be-processed data, so that the two SoCs cooperate and jointly achieve a processing performance higher than their respective processing capabilities. The circuits of the first SoC 610 and the second SoC 620 are described in later paragraphs.

Please refer to FIGS. 6-7. In an enhancement mode (i.e., the mode in which the first SoC 610 cooperate with the second SoC 620), the first CPU 612 is configured to divide the to-be-processed data into multiple input parts including a first input part and a second input part according to the type/feature (e.g., image size and/or frame rate) of the to-be-processed data and/or according to the information (e.g., a pixel count indicative of the position of a currently received pixel) relevant to the to-be-processed data. The first CPU 612 is further configured to receive and process the first input part in the enhancement mode, and then generate and output first output data.

In an exemplary implementation, the first input part for the first SoC 610 includes non-sensitive data such as system operation data of a common operating system (e.g., open-source operating system); and the second input part for the second SoC 620 includes sensitive data such as any of the following: to-be-verified data (e.g., identification data including, but not limited to, any of finger print data, personal identification number (PIN), and payment information); confidential/secret data (e.g., a private key for communication and/or a certificate for access); and protected data (e.g., digital rights management (DRM) data including, but not limited to, encrypted compressed video data). At least a part of the first SoC 610 operates in a rich execution environment (REE) to process the non-sensitive data while all of the second SoC 620 operates in a trust execution environment (TEE) to process the sensitive data. The sensitive data of the second input part is transmitted from the first SoC 610 to the second SoC 620 via the external circuit 630. On condition that one can easily intercept the sensitive data from the external circuit 630 (e.g., a transmission line formed on a circuit board), the communication between the first SoC 610 and the second SoC 620 preferably complies with a security transmission regulation (e.g., Digital Transmission Content Protection; DTCP); and on condition that one is hard to intercept the sensitive data from the external circuit 630 (e.g., solder pads and/or solder balls inside a semiconductor package), the communication between the first SoC 610 and the second SoC 620 doesn't need to comply with the security transmission regulation.

In an exemplary implementation, the first SoC 610 includes two divisions; and one of them operates in REE while the other one operates in TEE. The first input part for the first SoC 610 includes non-sensitive data and/or sensitive data; and since data transmission between the two divisions of the first SoC 610 is fulfilled inside the first SoC 610, this data transmission doesn't need to comply with the security transmission regulation in normal circumstances.

Please refer to FIGS. 6-7. The first transceiver circuit 614 is coupled to the first CPU 612, and configured to receive the second input part from the first CPU 612 or from a memory (e.g., the system memory 920 in FIG. 9) in the performance-enhancement mode, and then forward the second input part to the second SoC 620 via the external circuit 630. The first transceiver circuit 614 is further configured to receive second output data from the second SoC 620 via the external circuit 630, and then forward the second output data. The second transceiver circuit 624 is configured to receive the second input part from the external circuit 630 in the performance-enhancement mode, and then forward the second output data to the first SoC 610 via the external circuit 630. The second CPU 622 is configured to receive the second input part from the second transceiver circuit 624 directly/indirectly in the performance-enhancement mode, and then process the second input part to generate the second output data; and the second CPU 622 is further configured to output the second output data to the second transceiver circuit 624.

Please refer to FIGS. 6-7. In an exemplary implementation, the first CPU 612 includes a first cache memory 6122 and the second CPU 622 includes a second cache memory 6222. When the first CPU 612 processes the first input part, the first CPU 612 uses the first cache memory 6122 to store first cache data (e.g., to-be-processed data or processed data) related to the first input part; and when the second CPU 622 processes the second input part, the second CPU 622 uses the second cache memory 6222 to store second cache data (e.g., to-be-processed data or processed data) related to the second input part. The first cache data and the second cache data are incoherent, which means that the first CPU 612 processes the first input part independently without considering the progress of the second CPU 622 processing the second input part, the second CPU 622 processes the second input part independently without considering the progress of the first CPU 612 processing the first input part, and the data stored in the first cache memory 6122 has no need to be coherent with the data stored in the second cache memory 6222; and the above-mentioned features are different from the features of the prior art (e.g., CCIX).

For better understanding, an exemplary implementation is described below. The first SoC 610 and the second SoC 620 cooperate to process a network video stream as shown in FIG. 8, wherein the first SoC 610 and the second SoC 620 are in charge of different phases as follows:

(1) S810: The first SoC 610 outputs login data (i.e., sensitive data) to the second SoC 620, wherein the login data is for accessing the service of the network video stream.
(2) S820: The second SoC 620 processes user account information and performs a verification process.
(3) S830: The second SoC 620 processes data related to DRM.
(4) S840: The first SoC 610 starts to play network video.
(5) S850: The first SoC 610 receives encrypted data of the network video stream from a network (e.g., internet) and then transmits some or all of the encrypted data (i.e., sensitive data) of the network video stream to the second SoC 620.
(6) S860: The second SoC 620 decrypts the encrypted data of the network video stream and generates decrypted data.
(7) S870: The second SoC 620 transmits the decrypted data to the first SoC 610 under the protection of DTCP.
(8) S880: The first SoC 610 outputs video data via a secure display path.

Figure 8:
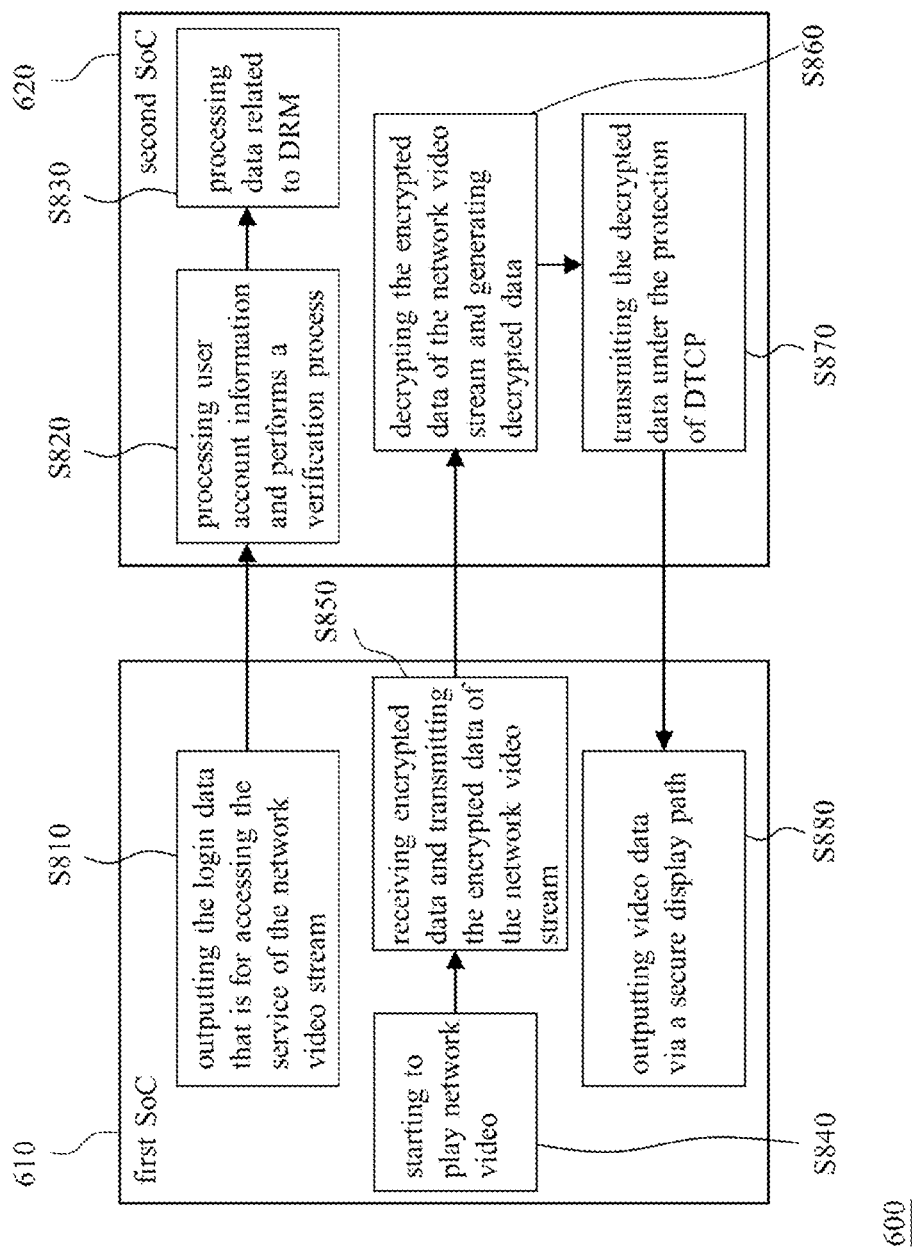
FIG. 8 shows an example of the first SoC and the second SoC of FIG. 6 cooperating with each other.
Figure 9:
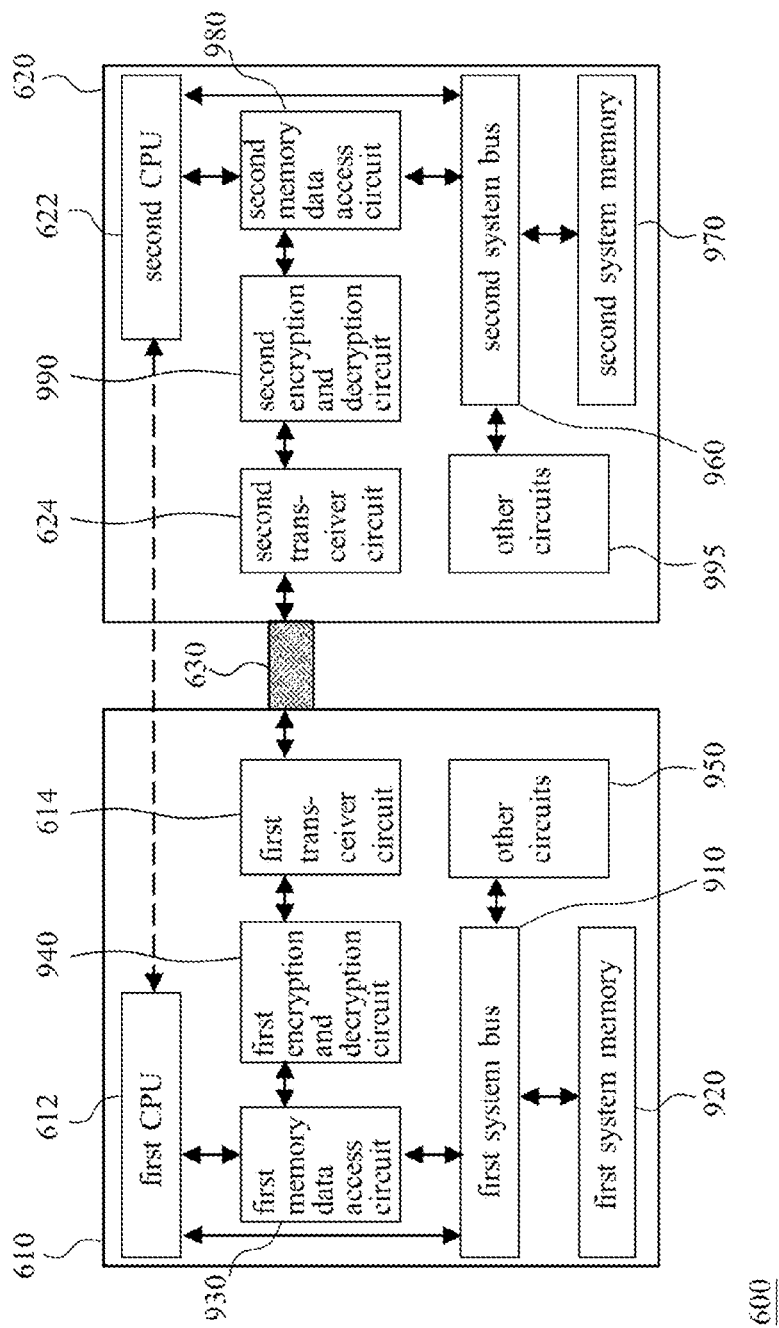
FIG. 9 shows another embodiment of the first SoC and the second SoC of FIG. 6.

Since people having ordinary skill in the art can appreciate how to realize each phase in FIG. 8 with the circuits in FIGS. 6-7 in view of this specification and the common knowledge of this technical field, redundant description is omitted here.

FIG. 9 shows another embodiment of the first SoC 610 and the second SoC 620 of FIG. 6. As shown in FIG. 9, the first SoC 610 not only includes the first CPU 612 and the first transceiver circuit 614, but also includes a first system bus 910, a first system memory 920 (e.g., DRAM), a first memory data access circuit 930, a first encryption and decryption circuit 940, and other circuits 950 (e.g., network circuit, USB circuit, audio circuit, and graphics processor) Similarly, the second SoC 620 not only includes the second CPU 622 and the second transceiver circuit 624, but also includes a second system bus 960, a second system memory 970 (e.g., DRAM), a second memory data access circuit 980, a second encryption and decryption circuit 990, and other circuits 995 (e.g., network circuit, USB circuit, audio circuit, and graphics processor). In addition, a dedicated transmission line (i.e., the dashed line in FIG. 9) can optionally be set between the first CPU 612 and the second CPU 622, and this allows the two CPUs to execute unidirectional/bilateral data transmission (e.g., transmission of interrupt request (IRQ) and/or transmission of control signal/information for the cooperation of the two SoCs). Furthermore, at least a part of the dedicated transmission line is set between the two SoCs, and it is a part of the external circuit 630. If no dedicated transmission line is set between the two SoCs, the signal transmission between the two SoCs can be fulfilled with the aforementioned memory data access circuit, encryption and decryption circuit, and transceiver circuit.

Please refer to FIG. 6 and FIG. 9. The first memory data access circuit 930 is a known or self-developed circuit, and it is configured to receive/forward commands/data from the first CPU 612, and to access the first system memory 920. The first CPU 612 may access the first system memory 920 via the first system bus 910 without the first memory data access circuit 930 according to the demand for implementation. The first encryption and decryption circuit 940 is a known or self-developed circuit, and it is configured to retrieve the second input part from the first memory access circuit 930 and encrypt the second input part, and to provide the encrypted second input part for the first transceiver circuit 614 which forwards the encrypted second input part to the second transceiver circuit 624. The first encryption and decryption circuit 940 is further configured to receive the second output data from the first transceiver circuit 614 and decrypt it, and to output the decrypted second output data to the first memory data access circuit 930. The operation of each circuit in the second SoC 620 is equivalent/similar to the operation of the same/similar circuit in the first SoC, and thus repeated and redundant description is omitted here. It should be noted that each encryption and decryption circuit can be disabled or omitted according to the demand for implementation.

In an exemplary implementation, the second input part includes compressed data. The second CPU 622 is used for decompressing the compressed data and thereby generating decompressed data as at least a part of the second output data; accordingly, the first CPU 612 doesn't need to spend resources for decompressing the second output data. In another exemplary implementation, the second input part includes audio data. The second CPU is used for performing an equalization process on the audio data to generate equalized audio data as at least a part of the second output data; accordingly, the first CPU 612 doesn't need to spend resources for performing the equalization process on the audio data.

Please refer to FIGS. 6, 7, and 9. In an exemplary implementation, each of the first SoC 610 and the second SoC 620 is a TV SoC. In an exemplary implementation, the second SoC 620 is enabled in the performance-enhancement mode, and is disabled/idle in a normal mode to reduced power consumption. Each of the above-mentioned modes can be activated/deactivated according to at least one of user setting, a current performance index of the first CPU 612, and the characteristics of the to-be-processed data (e.g., sensitivity or independence). For example, when the current performance index indicates that the load of the first CPU 612 is heavy, the second SoC 620 is enabled to cooperate with the first SoC 610. In an exemplary implementation, the combination of the first output data and the second output data jointly determine a data amount per unit of time, the data amount per unit of time exceeds the processing capability of the first CPU 612 per unit of time and also exceeds the processing capability of the second CPU 622 per unit of time, which means that the processing capability of the data processing device 600 is stronger than the processing capability of any of the first SoC 610 and the second SoC 620.

Figure 10:
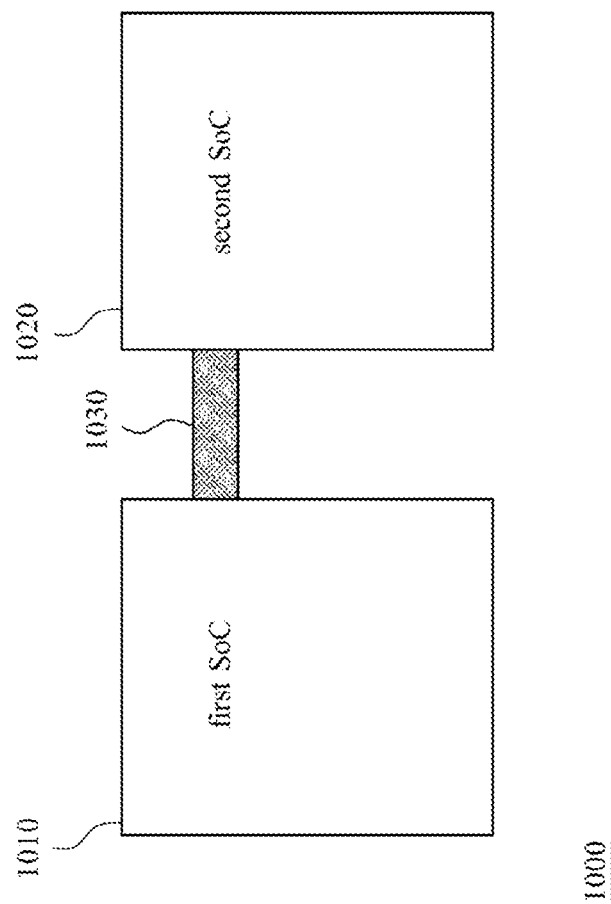
FIG. 10 shows an embodiment of the graphics processing device of the present disclosure.

FIG. 10 shows an embodiment of the graphics processing device of the present disclosure. The graphics processing device 1000 in FIG. 10 includes a first SoC 1010, a second SoC 1020, and an external circuit 1030. The first SoC 1010 functions as a main SoC, the second SoC 1020 functions as a performance-enhancing SoC, and they have the same or different circuit configurations. It should be noted that some circuit(s) in the first SoC 1010 and/or in the second SoC 1020 can be disabled/idle or omitted according to the demand for implementation. The external circuit 1030 is not included in any of the first SoC 1010 and the second SoC 1020; in other words, the external circuit 1030 is set outside any of the first SoC 1010 and the second SoC 1020. For example, providing both the first SoC 1010 and the second SoC 1020 are packaged chips set on a circuit board (e.g., PCB), the external circuit 1030 is/includes a signal transmission line of the circuit board. For another example, providing both the first SoC 1010 and the second SoC 1020 are non-packaged dies included in a semiconductor package (e.g., wire-bonding package, flip-chip package), the external circuit 1030 is a part of the semiconductor package and includes at least one of the following: at least one connection pad; at least one connection wire; at least one conducting ball (e.g., metal ball); and at least one transmission line formed on the surface of a substrate of the semiconductor package or on a layer of the substrate (e.g., multilayer substrate).

Figure 11:
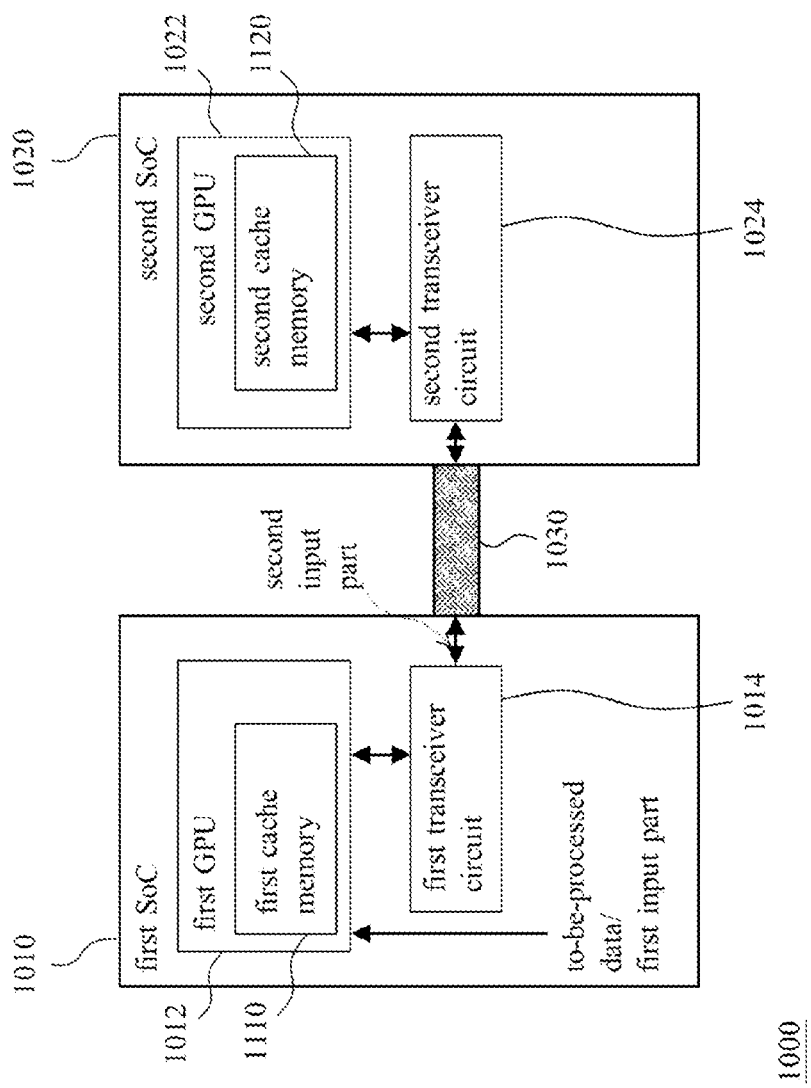
FIG. 11 shows an embodiment of the first SoC and the second SoC of FIG. 10.

FIG. 11 shows an embodiment of the first SoC 1010 and the second SoC 1020 of FIG. 10. As shown in FIG. 11, the first SoC 1010 includes a first GPU 1012 and a first transceiver circuit 1014, and the second SoC 1020 includes a second GPU 1022 and a second transceiver circuit 1024. Each of the first SoC 1010 and the second SoC 1020 is configured to process a part of to-be-processed data, so that the two SoCs cooperate and achieve a processing performance higher than their respective processing capabilities. The circuits of the first SoC 1010 and the second SoC 1020 are described in later paragraphs.

Please refer to FIGS. 10-11. The first GPU 1012 is configured to divide the to-be-processed data into multiple input parts including a first input part and a second input part in an enhancement mode (i.e., the mode in which the first SoC 1010 cooperate with the second SoC 1020). The first GPU 1012 is further configured to receive and the process the first input part in the enhancement mode, and to generate and output first output data according to the first input part. The first transceiver circuit 1014 is configured to retrieve the second input part from the first GPU 1012 or from a memory data access circuit (not shown) controlled by the first GPU 1012 in the enhancement mode, and to forward the second input part to the second SoC 1020 via the external circuit 1030. The first transceiver circuit 1014 is further configured to receive second output data via the external circuit 1030 in the enhancement mode, and to forward the second output data. The second transceiver circuit 1024 is configured to receive the second input part via the external circuit 1030 in the enhancement mode, and to transmit the second output data to the first SoC 1010 via the external circuit 1030 in the enhancement mode. The second GPU 1022 is configured to receive the second input part from the second transceiver circuit 1024 in the enhancement mode, and to process the second input part and thereby generate the second output data. The second GPU 1022 is further configured to output the second output data to the second transceiver circuit 1024 in the enhancement mode.

Please refer to FIGS. 10-11. In an exemplary implementation, the first GPU 1012 includes a first cache memory 1110, and the second GPU 1022 includes a second cache memory 1120. When the first GPU 1012 processes the first input part, the first GPU 1012 uses the first cache memory 1110 to store first cache data (e.g., to-be-processed data or processed data) related to the first input part; and when the second GPU 1022 processes the second input part, the second GPU 1022 uses the second cache memory 1120 to store second cache data (e.g., to-be-processed data or processed data) related to the second input part. The first cache data and the second cache data are incoherent, which means that the first GPU 1012 processes the first input part independently without considering the progress of the second GPU 1022 processing the second input part, the second GPU 1022 processes the second input part independently without considering the progress of the first GPU 1012 processing the first input part, and the data stored in the first cache memory 1110 has no need to be coherent with the data stored in the second cache memory 1120; and the above-mentioned features are different from the features of the prior art (e.g., CCIX).

Figure 12:
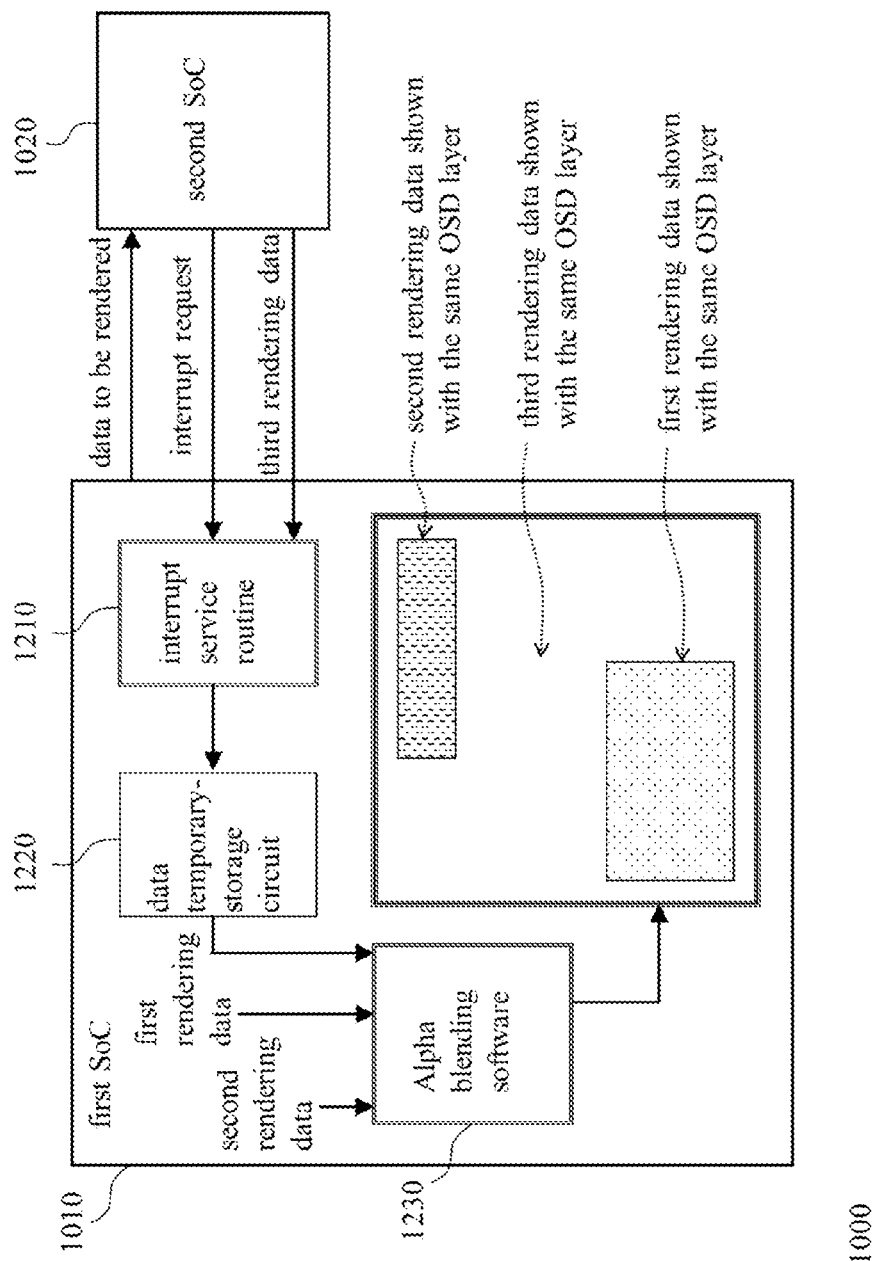
FIG. 12 shows an exemplary implementation of the embodiment of FIG. 11.

On the basis of the above description, in an exemplary implementation the first SoC 1010 executes a first application (e.g., a photography application or a second game application) and a second application (e.g., a chat application), and the second SoC 1020 executes a third application (e.g., a first game application). The first input part includes first data related to the first application, and includes second data (i.e., data to be rendered by the first GPU 1012) related to the second application. The second input part includes third data related to the third application, and includes keyboard/mouse event data (i.e., data to be rendered by the second GPU 1022) for controlling the execution of the third application. The first output data includes first rendering data (e.g., the image data to be displayed according to the first application), and includes second rendering data (e.g., the image data to be displayed according to the second application). The second output data includes third rendering data (e.g., the image data to be displayed according to the third application), and includes an interrupt request. The first SoC 1010 performs an interrupt service routine (ISR) (e.g., the ISR 1210 in FIG. 12) to store the third rendering data in a data storage circuit (the data storage circuit 1220 in FIG. 12) according to the interrupt request from the second SoC 1020; in addition, the first SoC 1010 executes a software (e.g., the known Alpha blending software 1230 in FIG. 12) to read the third rendering data from the data storage circuit, and superimposes the first rendering data, the second rendering data, and the third rendering data to show these data with the same on-screen display (OSD) layer as shown in FIG. 12. An example of the data storage circuit 1220 includes three stages of buffers connected in a ring type (not shown); after the first SoC 1010 stores the third rendering data in the $X^{th}$ buffer of the data storage circuit 1220, the first SoC 1010 updates the write pointer of the data storage circuit 1220 to redirect the write pointer to the $(X+1)^{th}$ buffer of the data storage circuit 1220 from the $X^{th}$ buffer; before the first SoC 1010 reads the third rendering data from the $X^{th}$ buffer of the data storage circuit 1220, the first SoC 1010 updates the read pointer to redirect the read pointer to the $X^{th}$ buffer from the $(X+2)^{th}$ buffer, wherein X, (X+1), and (X+2) are three consecutive integers and the following number after (X+2) is X so that the three stages of buffers can be used in a circular way. It should be noted that the aforementioned ISR and the technology of superimposing rendering data are known or self-developed technologies.

Figure 13:
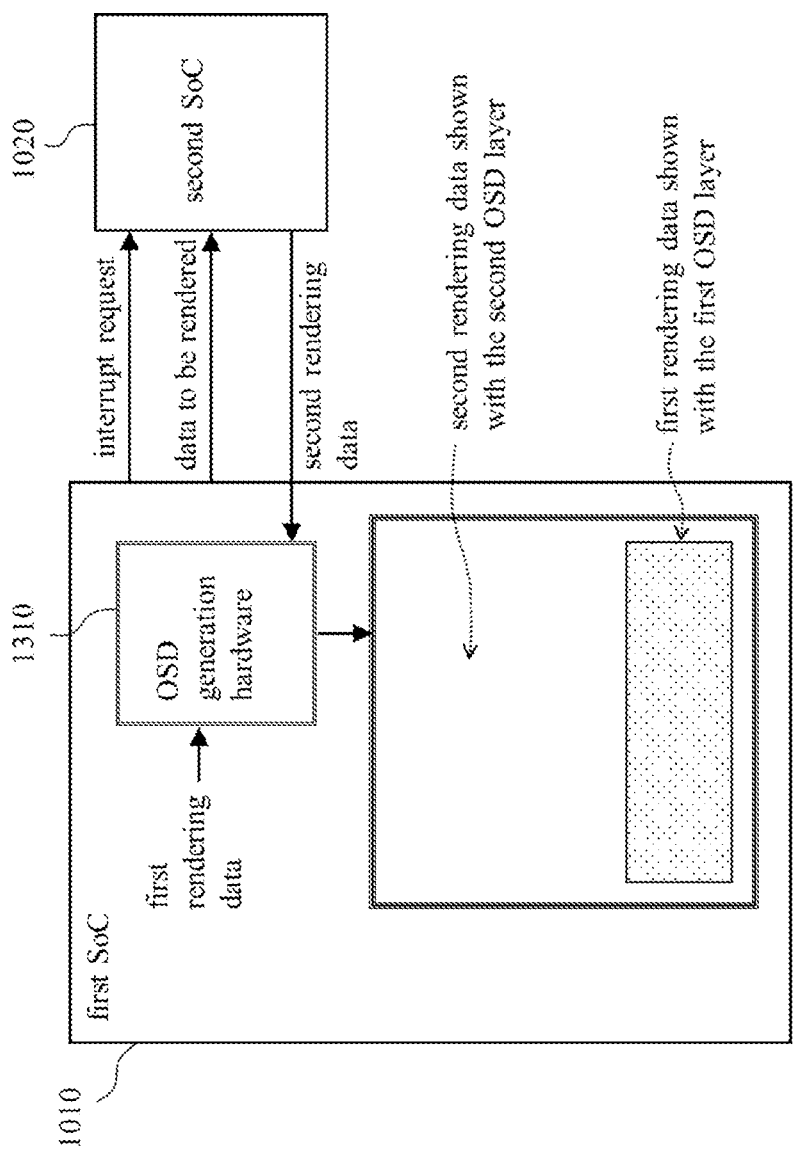
FIG. 13 shows another exemplary implementation of the embodiment of FIG. 11.

In another exemplary implementation illustrated with FIG. 13, the first input part includes main user interface data (i.e., data to be rendered by the first GPU 1012), and the second input part includes two-dimensional data/position data (i.e., data to be rendered by the second GPU 1022) and an interrupt request which requests the second GPU 1022 to receive and process the second input part. The first output data includes first rendering data; the second output data includes second rendering data (e.g., augmented reality (AR) data or virtual reality (VR) data). The first SoC 1010 superimposes figures with hardware (e.g., the known OSD generation hardware 1310 in FIG. 13), and thereby shows the first rendering data with a first OSD layer and shows the second rendering data with a second OSD layer. It should be noted that the above-mentioned hardware superimposition technology is a known or self-developed technology.

Please refer to FIG. 10. In an exemplary implementation, each of the first SoC 1010 and the second SoC 1020 is a TV SoC. In an exemplary implementation, the second SoC 1020 is enabled in the performance-enhancing mode, and is disabled/idle in a normal mode to reduce power consumption. Each of the above-mentioned modes can be activated/deactivated according to the at least one of the following: user setting; a current performance index of the first GPU 1012; and the type/feature of the to-be-processed data (e.g., data requiring a lot of computation resources). In an exemplary implementation, the combination of the first output data and the second output data jointly determine a data amount per unit of time; this data amount per unit of time exceeds the processing capability of the first GPU 1012 per unit of time, and also exceeds the processing capability of the second GPU 1022 per unit of time; in other words, the processing capability of the graphics processing device 1000 is stronger than the processing capability of any of the first SoC 1010 and the second SoC 1020.

Please refer to FIG. 10 in view of FIG. 5 or FIG. 9. In an exemplary implementation, the first SoC 1010 includes a first CPU and a first system bus (not shown in FIG. 10), and the second SoC 1020 includes a second CPU and a second system bus (not shown in FIG. 10). The first GPU 1012 communicates with the first CPU through the first system bus, and thus uses the computation resources of the first CPU. The second GPU 1022 communicates with the second CPU through the second system bus, and thus uses the computation resources of the second CPU.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out in many ways according to the present disclosure. It should also be noted that each of the aforementioned known or self-developed technologies alone falls beyond the scope of the present invention, and is commonly used in this technical field; accordingly, the detail of these technologies is omitted in this specification.

To sum up, each of the image processing device, the data processing device, and the graphics processing device can achieve a higher processing performance through the cooperation of multiple SoCs.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A graphics processing device comprising circuit chips and an external circuit, each of the circuit chips being a system on a chip (SoC), and the circuit chips being configured to cooperate and including a first SoC and a second SoC, wherein:
   the first SoC includes:
      a first graphics processing unit (GPU) configured to divide to-be-processed data into multiple input parts including a first input part and a second input part in a performance-enhancing mode, and to process the first input part to generate and output first output data in the performance-enhancing mode; and
      a first transceiver circuit coupled to the first GPU, and configured to transmit the second input part to the second SoC via the external circuit in the performance-enhancing mode, and further configured to receive second output data from the external circuit to forward the second output data in the performance-enhancing mode;
   the external circuit is set outside any of the first SoC and the second SoC; and
   the second SoC includes:
      a second transceiver circuit configured to receive the second input part from the external circuit in the performance-enhancing mode, and further configured to transmit the second output data to the first SoC via the external circuit in the performance-enhancing mode; and
      a second GPU coupled to the second transceiver circuit, and configured to receive and process the second input part to generate the second output data in the performance-enhancing mode, and then output the second output data to the second transceiver circuit in the performance-enhancing mode.

2. The graphics processing device of claim 1, wherein when the first GPU processes the first input part, the first GPU stores first cache data related to the first input part in a first cache memory; when the second GPU processes the second input part, the second GPU stores second cache data related to the second input part in a second cache memory; and the first cache data and the second cache data are incoherent.

3. The graphics processing device of claim 1, wherein the first output data includes first rendering data, the second output data includes second rendering data, and the first SoC executes a software to superimpose the first rendering data and the second rendering data.

4. The graphics processing device of claim 3, wherein the first rendering data and the second rendering data include two of the following: image data indicative of a user input message; photographic data; image data of a first game; and image data of a second game.

5. The graphics processing device of claim 3, wherein the first SoC executes an interrupt service routine (ISR) to store the second rendering data in a data storage circuit according to an interrupt request from the second SoC; and the first SoC executes the software to retrieve the second rendering data from the data storage circuit, and then superimposes the first rendering data and the second rendering data.

6. The graphics processing device of claim 5, wherein after the first SoC stores the second rendering data in the data storage circuit, the data storage circuit updates a write pointer of the data storage circuit accordingly; and before the first SoC reads the second rendering data from the data storage circuit, the data storage circuit updates a read pointer of the data storage circuit.

7. The graphics processing device of claim 5, wherein the software is an Alpha blending software.

8. The graphics processing device of claim 1, wherein the first output data includes first rending data; the second output data includes second rendering data; the first SoC superimposes the first rendering data and the second rendering data, and shows the first rendering data with a first on-screen display (OSD) layer and shows the second rendering data with a second OSD layer.

9. The graphics processing device of claim 8, wherein the first rendering data and the second rendering data include two of the following: user interface data; augmented reality (AR) data; and virtual reality (VR) data.

10. The graphics processing device of claim 1, wherein both the first SoC and the second SoC are packaged chips set on a circuit board, and the external circuit is a part of the circuit board.

11. The graphics processing device of claim 10, wherein the external circuit includes a signal transmitting circuit of the circuit board.

12. The graphics processing device of claim 1, wherein both the first SoC and the second SoC are non-packaged dies included in a semiconductor package, and the external circuit is a part of the semiconductor package.

13. The graphics processing device of claim 12, wherein the external circuit includes at least one of the following: at least one connection pad; at least one connection wire; at least one conducting ball; and at least one transmission line formed on a surface of a substrate of the semiconductor package or included in the substrate.

14. The graphics processing device of claim 1, wherein each of the first SoC and the second SoC is a television SoC.

15. The graphics processing device of claim 14, wherein the first GPU transmits a control signal to the second GPU to ensure that the second GPU receives and processes the second input part in an expected manner.

16. The graphics processing device of claim 1, wherein the first SoC and the second SoC have same circuit configurations, the first SoC functions as a main SoC, and the second SoC functions as a performance-enhancing SoC.

17. The graphics processing device of claim 1, wherein the second SoC is disabled in a normal mode and is enabled in the performance-enhancing mode, and a first processing capability demand in the normal mode is lower than a second processing capability demand in the performance-enhancing mode.

18. The graphics processing device of claim 17, wherein in the normal mode the second SoC is disabled according to at least one of the following: user setting; a current performance index of the first GPU; and a type of the to-be-processed data.

19. The graphics processing device of claim 1, wherein a combination of the first output data and the second output data jointly determine a data amount per unit of time, and the data amount per unit of time exceeds a processing capability of the first GPU per unit of time and also exceeds a processing capability of the second GPU per unit of time.

* * * * *